United States Patent [19]

Moshovos et al.

[11] Patent Number: 5,781,752
[45] Date of Patent: Jul. 14, 1998

[54] TABLE BASED DATA SPECULATION CIRCUIT FOR PARALLEL PROCESSING COMPUTER

[75] Inventors: Andreas I. Moshovos; Scott E. Breach; Terani N. Vijaykumar; Gurindar S. Sohi, all of Madison, Wis.

[73] Assignee: Wisconsin Alumni Research Foundation, Madison, Wis.

[21] Appl. No.: 773,992

[22] Filed: Dec. 26, 1996

[51] Int. Cl.[6] ........................................ G06F 9/38
[52] U.S. Cl. ............................................ 395/392
[58] Field of Search ................................ 395/392

[56] References Cited

U.S. PATENT DOCUMENTS 5,664,138 9/1997 Yoshida ........................ 395/395
5,666,506 9/1997 Hesson et al. .................. 395/392

OTHER PUBLICATIONS

Gurinda Sohi et al., Instruction Issue Logic for High-Performance Interruptable Pipelined Processors; ACM 1987, pp. 27–34.

*Primary Examiner*—Krisna Lim
*Attorney, Agent, or Firm*—Quarles & Brady

[57] ABSTRACT

A predictor circuit permits advanced execution of instructions depending for their data on previous instructions by predicting such dependencies based on previous misspeculations detected at the final stages of processing. Synchronization of dependent instructions is provided by a table creating entries for each instance of potential dependency. Table entries are created and deleted dynamically to limit total memory requirements.

9 Claims, 7 Drawing Sheets

TABLE BASED DATA SPECULATION CIRCUIT FOR PARALLEL PROCESSING COMPUTER

This invention was made with United States government support awarded by the following agencies:
ARPA Grant No. DABT63-95-C-0127;
ONR, Grant No. N00014-93-1-0465; and
NSF, Grant Nos.: CCR-9303030 and MIP-9505853.
The United States has certain rights in this invention.

FIELD OF THE INVENTION

The invention relates generally to architectures of electronic computers and specifically to electronic computers for parallel processing.

BACKGROUND OF THE INVENTION

General Computer Architecture and Instruction Level Parallel (ILP) Processing In an electronic computer with a single processing unit, the processing unit may communicate with a memory holding the data and program instructions. The processing unit may also hold data in internal registers. The program instructions are executed by the processing unit which operates on the data according to the instructions.

Typically, the processing unit repeats a series of fetch/execute cycles in which each instruction is first fetched from memory and then executed. The order in which the instructions are executed is determined by the value of a program counter within the processing unit. After each execution of an instruction, the program counter normally increases in value by one so that the next instruction memory is fetched. The order of the instructions in the stored program will be termed "memory order".

Some instructions, when executed, cause data to be loaded into the processing unit from memory or stored from the processing unit to memory. Other instructions may perform their operation on data that are stored in registers without loading or storing data from or to memory. Still other instructions change the value of the program counter permitting the processing unit to jump or branch through the program instructions according to a "program order" that normally differs from the memory order. The branch or jumps in a program may be conditional on values of data used by the program that may change as the program is executed.

One method of increasing the speed of electronic computers involves using multiple processing and/or functional units to execute multiple instructions at the same time or in an "execution order" differing from the program order. Computers using this technique are termed "parallel processing units". An instruction level parallel ("ILP processing unit") is one where individual instructions of a single program are separated to be run on different processing units in contrast to systems in which independent programs may be assigned different processing units, for example.

Control and Data Dependencies

There are two types of dependencies exhibited by instructions. "Control dependency" is a dependency of instructions after a conditional branch or jump instruction on whether the branch or jump was taken. For example, instructions immediately after a branch are properly executed only if the branch is not taken. "Data dependency" is a dependency of instructions that use data on earlier instructions that change the data. These latter instructions may correctly execute only if the earlier instructions using the same data do not change the common data or have completed the change of the common data. A dependency is "unambiguous" if it necessarily produces an error when the dependent instruction is executed before the instruction on which it is dependent. The dependence of an instruction may remain ambiguous until both instructions involved are executed. A dependency between two instructions is ambiguous if it cannot be determined whether a dependency really exists without executing the instructions.

Usually, instructions that are data dependent must be executed in the program order.

Control and Data Speculation

Since dependencies are often ambiguous, as the ILP processing unit prepares to execute an instruction, it cannot always determine if the instruction will in fact be dependent on earlier instructions that have not yet completed their execution. In the case of ambiguous dependencies and unless special circuitry is provided as will be explained in the next paragraph, the ILP processing unit is forced to assume dependencies exist.

However, it is quite often the case that an ambiguous dependency is resolved as no dependency at all. For this reason, some ILP processors may provide for "speculation", that is, execution of an instruction that has ambiguous dependency as if it had no dependency at all. One may speculate on control dependencies and on data dependencies. Control speculation, for example, might involve executing an instruction that follows a branch instruction without knowing the outcome of the branch (and thus whether the following instruction should have been executed or was branched around). Data speculation, for example, might involve reading from memory to obtain data for a later instruction, even though there are earlier STORES to that memory location that have not yet been completed and that may change the value of the memory location.

Squashing

Control and data dependencies are important in an ILP processing unit which, in the course of execution of instructions, may execute some dependent instructions before the instructions on which they are dependent. If the dependency is unambiguous, then the results of the prematurely executed dependent instructions must be discarded ("squashed") and the instructions of the correct branch executed.

Squashing instructions is a time consuming process that to some extent defeats the advantages to be gained from parallel processing. In order to avoid the problems associated with unambiguous dependencies, it is necessary that when the ILP processing unit speculates, that it is mostly correct.

Speculation in an ILP Processor

In an ILP processor, the processor may fetch multiple instructions at a single time and an allocation circuit allocates those instructions to separate processing units. The separate processing units may read data from memory and perform arithmetic or logical operations on that data. A data speculation circuit may exist to detect data dependencies and report any mis-speculation to a retirement circuit. The retirement circuit collects results generated by the independent processing units and "retires" the instructions executed by those processing units by writing final results to memory. The retirement circuitry also resolves mis-speculation detected by the data speculation circuit, that is, instructions that were executed out of program order but were in fact dependent on an earlier instruction in the execution order and have produced an erroneous result. These instructions are squashed as is understood in the art. Data speculation circuitry currently does not decide when to do data speculation. Either all memory accesses are speculated or none at all.

For either type of speculation to be successful (control or data speculation), the performance cost associated with the speculation must be low. The performance cost is a function of the frequency that speculation is required, the time required to perform the speculation, the probability of mis-speculation and the time required to recover from a mis-speculation. A cumbersome or inaccurate speculation system may hurt overall system performance, especially when many dependencies must be evaluated.

Because the ILP processing is relevant primarily for high speed processing units, the speculation process must be implemented in circuitry rather than software. The process of speculation must be capable of rapid execution using limited amounts of high speed memory.

Control speculation is well understood in the art. The points were control speculation is needed are clearly identified by conditional branch and jump instructions (we will refer to these instructions as "control transfer instructions"). Typically all control transfer instructions are speculated since: (1) control transfer instructions are relatively frequent, (2) relatively few instructions from those that appear between two consecutive control transfer instructions can be executed in parallel, (3) typically the performance of a processor that always mis-speculates on control is virtually the same as the performance of a processor that never speculates on control.

In contrast the points where data speculation is needed are not clear since any instruction loading data from memory can be data dependent on any previous instructions that writes to memory. Consequently, predicting and tracking data dependencies, "data dependence speculation" can easily become overwhelming. Furthermore, the cost of a data mis-speculation typically cannot be neglected, that is the performance of a processor that always mis-speculates on data dependencies is far less than that of a processor that never speculates on data.

BRIEF SUMMARY OF THE INVENTION

The present inventors have recognized that most data dependence mis-speculations can be attributed to a few static STORE/LOAD instruction pairs. Furthermore, these instruction pairs exhibit "temporal locality" that is, if one LOAD/STORE pair causes a data mis-speculation at a given point in time, it is highly likely that a later instance of the same pair will soon cause another mis-speculation. For this reason, a table based approach may be used in which data dependent instructions likely to be a source of mis-speculation, are stored in a small, high speed memory. These particular instruction pairs can be identified based on previous mis-speculations.

Very low overhead in a table based data dependence speculation is obtained by a three-tiered approach. If there is no history of data mis-speculation, an instruction is executed without further inquiry. This will be the case for most data independent instructions. If there has been a mis-speculation with a given LOAD instruction, a predictor based on the past history of mis-speculations for that LOAD instruction is employed to determine whether the instruction should be executed or delayed. Thus, instructions that are typically not dependent may be executed immediately. If the instruction is to be delayed, a synchronization table is used to determine when the instruction is to be performed.

Specifically, the present invention provides a speculation decision circuit for use in a processor capable of executing program instructions in an execution order differing from the program order of the instructions, the processing unit further having a data speculation circuit for detecting data dependence between instructions and detecting a mis-speculation where a data consuming instruction dependent for its data on a data producing instruction of earlier program order is, in fact, executed before the data consuming instruction. The speculation decision circuit includes a predictor circuit receiving the mis-speculation signal from the data speculation circuit to produce a prediction associated with the particular data producing/consuming instruction pair and based on the mis-speculation indication. A prediction threshold detector prevents data speculation for instructions having a prediction value within a predetermined range. This prediction threshold detector may include an instruction synchronizing circuit instructing a processing unit to delay a later execution of the particular data consuming instruction until after the execution of the particular data producing instruction when the prediction associated with the data producing/consuming instruction pair is within a predetermined range.

Thus, it is one object of the invention to provide a predictor circuit that may identify data dependencies on an on-going or dynamic basis. Recognizing that there are relatively few instructions which will cause data mis-speculations, these instructions are identified by reference to historical mis-speculation associated with the instructions as stored in a prediction.

The instruction synchronization circuit may include a prediction table listing certain data consuming instructions and certain data producing instructions each associated with a prediction. The instruction synchronization circuit will delay the particular data consuming instruction only when the prediction associated with the data consuming instruction is within a predetermined range of predictions and when the particular data consuming instruction is in the prediction table.

Thus, it is another object of the invention to provide a prediction of data dependence which adds very little overhead to the execution of instructions that historically have not resulted in mis-speculation. If the particular data consuming instruction is not in the prediction table, no further inquiry into the prediction table is required.

The instruction synchronization circuit may also include a synchronization table associating certain data consuming instructions and certain data producing instructions, each with a flag indicating whether the respective data producing instruction has been executed. The instruction synchronization circuit delays the subsequent instances of the certain data consuming instruction only when the prediction associated with the data consuming instruction is within a predetermined range and when the particular data consuming instruction is in the prediction table and when the flag indicates that particular data producing instruction has not been executed.

Thus, it is another object of the invention to provide reduced instruction overhead even for instructions that have a history of mis-speculation when it is unlikely that, in the given instance, mis-speculation will occur. If the prediction indicates that mis-speculation is unlikely, no further synchronization steps need be taken.

It is yet another object of the invention to allow data consuming instructions that are historically dependent on preceding data producing instructions to be executed rapidly if the preceding data producing instruction has already been executed. Thus, if the flag indicates that the data producing instruction has been executed, the data consuming instruction may be immediately executed without further waiting.

The predictor circuit may create an entry in this synchronization table only after mis-speculation has occurred for a previous instance of the particular data consuming instruction and particular data producing instruction of the entry. After synchronization has occurred, this entry may be removed.

Thus, it is another object of the invention to provide a predictor circuit that minimizes the need for storage. Synchronizing table entries, which may be more numerous than the prediction table entries as a result of possible multiple instances of each instruction, have entries in the synchronization table that are dynamically created and released to minimize storage requirements. This also minimizes search overhead in identifying instructions within this table.

The foregoing and other objects and advantages of the invention will appear from the following description. In this description, references made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

An Example Program with Data Dependency Referring now to the following Table I, an example object code program may have three instructions: I1, I2 and I3.

TABLE I

| | |
|---|---|
| I1 | st M($R_1$) |
| I2 | ld M($R_2$) |
| I3 | ld M($R_3$) |

These instructions provide for a storage of data from a processor to a memory location and the loading of data from the memory location to the processor.

The first instruction I1 stores data from a processor register (implied in the instruction) to memory at a specific address determined by the contents of register $R_1$ of the processing unit. Generally, the contents of register $R_1$ will have been set by an earlier instruction and cannot be deduced simply by looking at instruction I1.

The following instructions I2 and I3 each load data from a specific physical address of memory to the processor register. Again, the registers $R_2$ and $R_3$ have been set by earlier instructions and the relevant addresses cannot be determined from these instructions alone.

If a parallel processor were to load the three instructions I1–I3 for parallel processing, there would be two possible data dependencies. I2 may be dependent on I1 insofar that the contents of register $R_1$ and $R_2$ may be the same and therefore the information stored in $M(R_1)$ may be the same that is loaded from memory location $M(R_2)$. For instruction I2 to be executed correctly, it may be necessary that instruction I2 wait for instruction I1. Likewise, instruction I3 may be dependent on instruction I1. That is, the address $M(R_3)$ may be the same as the physical address $M(R_1)$.

Each of these dependencies is ambiguous. That is, it cannot be determined whether there is in fact a dependency without knowing the contents of registers R1, R2 and R3 which cannot be deduced from the instructions alone.

In a parallel processor that seeks to load blocks of instructions and execute them in parallel, possibly out of their memory or program order, it is important to identify and address ambiguous data dependencies to eliminate mis-speculation and time consuming instruction squashing.

General Processor Architecture

Figure 1:
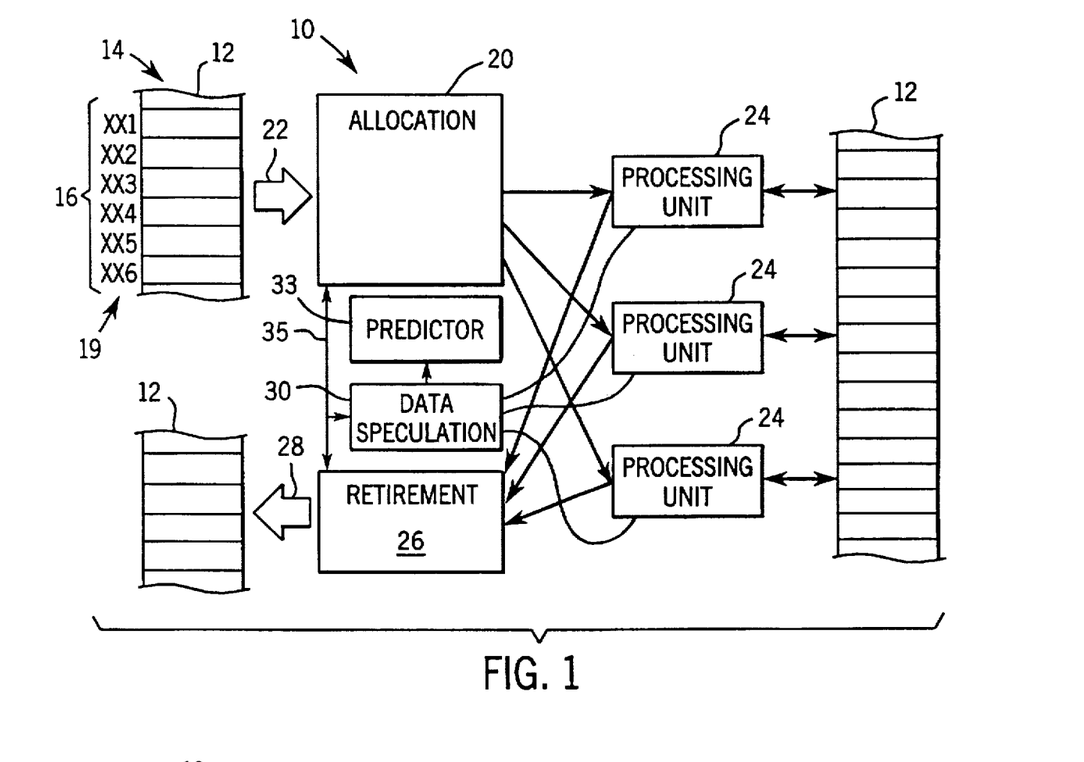
FIG. 1 is a block diagram showing the architecture of an instruction level parallel processor having multiple processing units, an allocation unit allocating instructions of a program in memory to the processing units, and a retirement unit retiring the parallel processed instructions, the latter unit incorporating the predictor circuit of the present invention.

Referring now to FIG. 1, an ILP processor 10 suitable for use with the present invention includes a memory 12 having a portion 14 holding a stored program 16 at a plurality of physical addresses 19 here depicted as xx1–xx6 where the values xx indicate some higher ordered address bits that may be ignored in this example.

The data speculation circuit 30 receives signals from the allocation circuit 20 that notify it of the program order of any instructions that are allocated to the processing units 24 and that will access memory. The data speculation circuit is responsible of keeping track of order of the memory operations as they are performed by the processing units so that it can detect any mis-speculations.

The ILP processor 10 includes an allocation circuit 20 which may read memory 12 and in particular program memory portion 14 to fetch a subset of the program 16 encompassing multiple instructions of an instruction window 22. Generally, as is understood in the art, the allocation circuit 20 sends different ones of these instructions to different independent processing units 24 for execution.

The processing units 24 may communicate with memory 12 for the purpose of obtaining data, but generally do not modify portions of the memory 12 that may be also read by other processing units 24. Thus, for example, an instruction which requires data to be obtained from memory 12 and added to a constant may be completely executed. However, an instruction, which stores a register to memory 12, may read the register but stop before the store operation which may modify memory 12 used by other processing units 24. An instruction that has been executed as far as possible is considered "ready to commit the operation". Prior to reading data from memory or requesting a store operation the processing units 24 notify the data speculation unit 30 of the operation so that the latter can, in conjunction with the allocation unit, keep track of the program and execution order of the operations.

A retirement circuit 26 receives signals from the processing units 24 indicating that their instructions are ready to perform the operation. The retirement circuit 26 then retires the instructions by writing any computed values to memory 12.

Prior to the retirement circuit 26 writing values to memory, a data speculation circuit 30 communicating with the allocation circuit 20 and the retirement circuit 26 detects mis-speculation. As described above, mis-speculation occurs in an instruction that has been executed prematurely and erroneously. Whenever a store instruction is ready to commit and write its data to a memory address, the data speculation circuit 30, checks to see if any subsequent in the instruction window load instructions have accessed the same memory address, and if so instructs the allocation circuit 20 and retirement circuit 26 that these load instructions are to be squashed and re-allocated by the allocation circuit 20 at a later time. Thus, for example, in the program Table I, if instructions I1 through I3 represent the instruction window 22 and instruction I3 has accessed memory prior to I1 writing to memory, the data speculation circuit 30 and at the time I1 is ready to commit checks if I3 has accessed the same memory address as I1, and if so it instructions the allocation circuit 20 and the retirement circuit 26 that I3 is to be squashed and reallocated at a later time. If so, the data speculation circuit 30 instructs the allocation circuit and retirement circuit 26 that instruction I3 is to be squashed and must be reallocated by the allocation circuit 20 at a later time. The writing of results from instructions that have not been squashed is then done by the retirement circuit 26 as indicated by arrow 28.

The retirement circuit 26, the data speculation circuit 30, and the allocation circuit 20 communicate by a number of control signals 35. Each of these elements described above are well known in the art.

The data speculation circuit 30 also communicates with the predictor circuit 33 of the present invention. The predictor circuit 33 provides a dynamic indication to the data speculation circuit 30 as to whether data speculation should be performed. The data speculation circuit 30 may then, based on the indication of the predictor circuit 33 stall the execution of a memory operation at the processing units 24 in order to avoid mis-speculation.

The prediction provided by the predictor circuit 33, as will be described, is updated based on historical mis-speculations detected by the data speculation circuit 30. For this reason, the data speculation circuit 30 must communicate with the predictor circuit 33 on an ongoing basis. Generally, as will be described below, the data speculation circuit 30 provides five signals to the predictor circuit 33 as listed in the following Table II.

TABLE II

| Signal Name | Description |
| --- | --- |
| HANDLE MIS-SPECULATION | The data speculation circuit has detected a mis-speculation. |
| HANDLE STORE | The data speculation circuit has decided to issue a STORE operation. |
| READY TO LOAD | The data speculation circuit is about to perform a speculative LOAD operation and needs information from the predictor as to whether the LOAD should wait. |
| HANDLE LOAD | The data speculation circuit has decided to perform a non-speculative LOAD operation without data dependency. |
| HANDLE SQUASH | The data speculation circuit has issued a squash for a particular instruction either as the result of data or control mis-speculation. |

Generally, prior to each instruction being retired, the instruction is provided to the data speculation circuit 30 which detects mis-speculations. The retirement circuit 26 also instructs the data speculation circuit 30 when a squash instruction is required.

Figure 2:
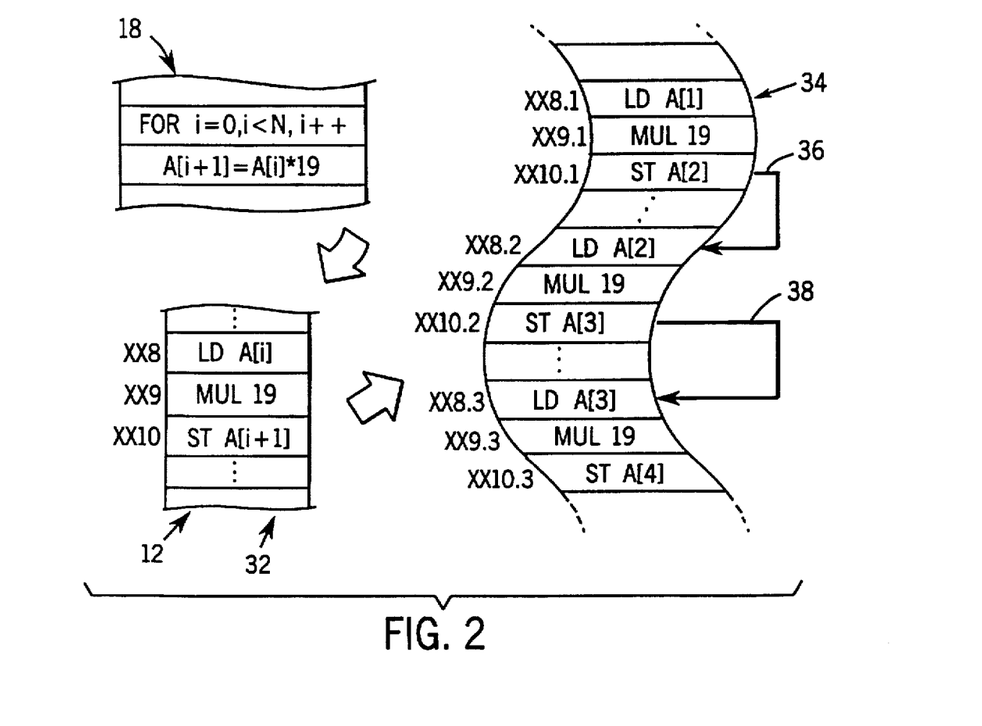
FIG. 2 is a fragmentary listing of a source code program and its corresponding object code instructions stored in memory order at physical addresses in memory and as unwound in program order producing multiple instances of each object code instruction in execution.

Referring to FIG. 2, an example source code program 18 includes two lines as follows:

for i=0, i<N, i++

A[i+1]=A[i]*19

These instructions represent typical source code instructions 18 which may create a data dependence speculation problem. The source code instructions 18 describe a loop executed N times in which each element of an array variable A(i) receives a value of 19 times that of its preceding array value.

The source code instructions 18, when reduced to machine language instructions 32, involve repeated LOAD and STORE operations. That is, to realize the second line of the source code instructions 18, the memory value of the array element A[i] must be: (1) loaded, (2) multiplied by 19, and (3) stored in memory location for array element A[i+1]. The LOAD and STORE instructions of the machine language instructions 32 have logical addresses within the memory 12 of xx8 and xx10, respectively, which may be used to identify the instructions uniquely.

As the machine language instructions 32 execute in a loop, they create an execution thread 34 of successive LOAD and STORE operations in which the variable 'i' is incremented from 0 to N. This execution thread 34 produces multiple instances of the LOAD and STORE instructions. For illustration purposes, each instance may be uniquely identified and is designated in FIG. 2 by an integer to the right of a decimal point forming a suffix to the physical address of the operation. Thus, the first instance of the LOAD instruction of the execution thread 34 is designated 8.1, the physical address of the LOAD instruction being 8 and the instance being 1. Likewise, the first STORE instruction is designated 10.1 and so forth.

The LOAD instruction 8.1 loads the contents of memory location A[1]. The STORE instruction 10.1 then stores a value in memory location A[2]. The LOAD instruction 8.2 then loads a value from the same memory location A[2]. This LOAD instruction 8.2 is thus unambiguously dependent on instruction 10.1, the data dependency 36 as indicated by an arrow. If instruction 8.2 were to be executed prior to instruction 10.1, it would operating on erroneous data.

Likewise, the LOAD instruction 8.3 which loads data from memory location A[3] is dependent on the STORE instruction 10.2 which stores data in that same memory location. This unambiguous dependence 38 is indicated by an arrow.

If the ILP processor 10 is to process the machine code instructions out of execution order, the data dependencies 36 and 38 must be observed to ensure that the out of order processing instruction 8.2 does not execute before instruction 10.1 and instruction 8.3 does not execute prior to instruction 10.2.

The circuitry necessary to construct an ILP processor will typically involve many millions of transistors, however, its operation can be described by means of a description of a flow chart and the data structures modified during the steps described. Implementing the device described below in discrete circuitry, although laborious, is a routine engineering matter whose practice will be well understood to those of ordinary skill in the art. Generally the data structures described below will be implemented in solid state memories and the steps of the flow chart will be incorporated into a state machine of a type well understood in the art.

Operation of the Data Speculation Circuit

Figure 3:
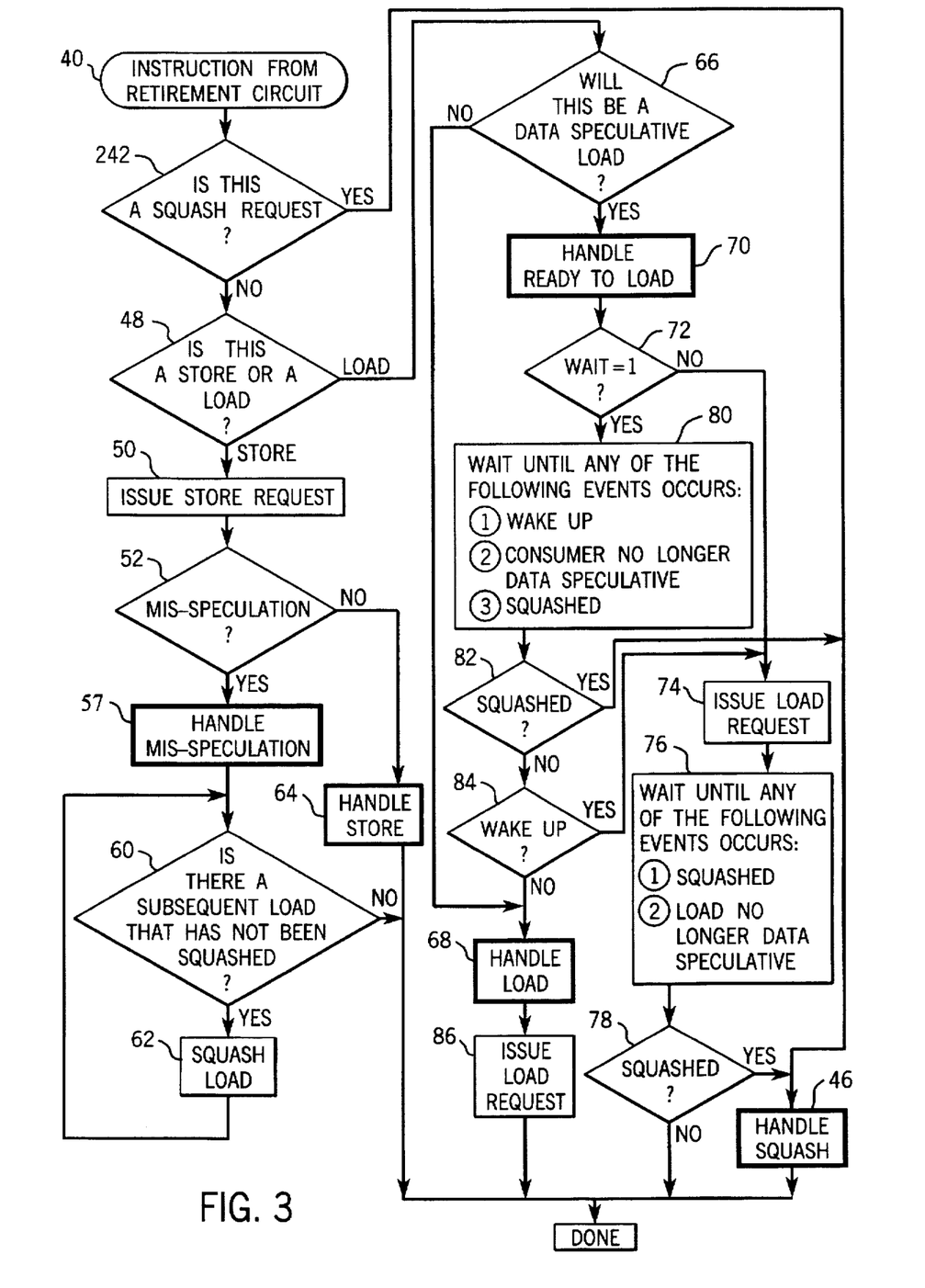
FIG. 3 is a flow chart of the operation of a typical data speculation circuit of the processor of FIG. 1 as modified to work with the predictor circuit of the present invention to provide READY TO LOAD, HANDLE STORE, HANDLE MIS-SPECULATION, HANDLE LOAD, and HANDLE SQUASH messages to the predictor circuit of the present invention.

Referring now to FIG. 3, the normal operation of the data speculation circuit 30 such as is known in the prior art, must be modified slightly to accommodate the present invention. These modifications provide the necessary signals referred to in Table 2 to the predictor circuit 33.

Starting at process block 40 of FIG. 3, a program instruction may be received from the retirement circuit 26 by the data speculation circuit 30 together with an indication that the instruction should be either squashed or is about to execute. At decision block 42, if the instruction is to be squashed, the data speculation circuit 30 provides a HANDLE SQUASH signal to the predictor circuit 33 as indicated by process block 46. Otherwise, the program proceeds to process block 48 which determines whether the instruction, which must be then assumed to be ready to issue is a LOAD or STORE instruction.

If the instruction is a STORE instruction, the program proceeds to process block 50 and a STORE request is issued. This STORE request may, for example, authorize the retirement circuit 26 to perform the STORE operation for the data.

At decision block 52, the data speculation circuit 30 checks other concurrent LOAD instructions to see if they have been prematurely executed and thus whether there has been a mis-speculation. At process block 57 if there has been a mis-speculation, a HANDLE MIS-SPECULATION signal is sent to the predictor circuit 33. This signal is used by the predictor circuit 33 in adjusting its prediction 109 as will be described. The dependent instructions are then squashed by the loop of decision block 60 and process block 62.

If at decision block 52 there was no mis-speculation, then the data speculation circuit 30 sends a HANDLE STORE signal to the predictor circuit 33 as indicated by process block 64 as will be described below.

If at decision block 48 the instruction received by the data speculation circuit 30 is a LOAD instruction, then at decision block 66 it is determined whether this is a data speculative LOAD, that is whether there are prior STORE instructions on which it might depend. If the answer is no, then the data speculation circuit 30 provides a HANDLE LOAD signal to the predictor circuit 33 as indicated by process block 68 as will be described below. Otherwise, the data speculation circuit 30 provides a HANDLE READY TO LOAD signal to the predictor circuit 33 as indicated by process block 70 as will also be described below.

The predictor circuit 33 will address the READY TO LOAD request from the data speculation circuit by making a prediction as to whether the LOAD should take place through the use of a wait flag. Thus, at subsequent decision block 72 if the wait flag equals 1 indicating that speculation should occur, the program proceeds immediately to process block 74 and a LOAD request is generated.

Next at process block 76, the data speculation circuit 30 waits for that particular instruction, either to be squashed indicating that it had been erroneously speculated or for an indication that it is no longer data speculative, that is any previous STORE instructions were for different memory addresses. At decision block 78, if the condition of case block 76 was that the instruction was squashed, the data speculation circuit 30 proceeds to the handle squash block 46 as is previously described.

At decision block 72, the predictor circuit 33 may have indicated that data speculation was not appropriate by providing that the wait flag equal 1. In this case, a LOAD request is not issued but instead, at case block 80, the data speculation circuit 30 waits for a wakeup signal indicating that the dependent STORE instruction has been executed or a signal indicating that the LOAD instruction is no longer speculative because the earlier STORE instructions did not write to its memory location or for a squash signal indicating that the instruction should be squashed as a result of a later occurring control or data dependency mis-speculation. At decision block 82, if the condition of process block 80 was that of being squashed, the program branches to the handle squash process block 46. If not, then at decision block 84 if the event was a wakeup signal, the program branches to previously described process block 74 where the LOAD request is issued. If the triggering event was that the LOAD instruction is no longer data speculative, then at process block 68, the HANDLE LOAD signal is provided by the data speculation circuit 30 to the predictor circuit 33 and the LOAD request is issued as indicated by process block 86.

Operation of the Predictor

1. Handle Ready to Load

Referring also to FIG. 1, after instructions of instruction window 22 have been received by the allocation circuit 20 and allocated to the processing units 24, the processing units 24 will begin execution of the instructions and at various times certain instructions will become ready for their operations to be performed and will be received by the retirement circuit 26 and the data speculation circuit 30.

Figure 4:
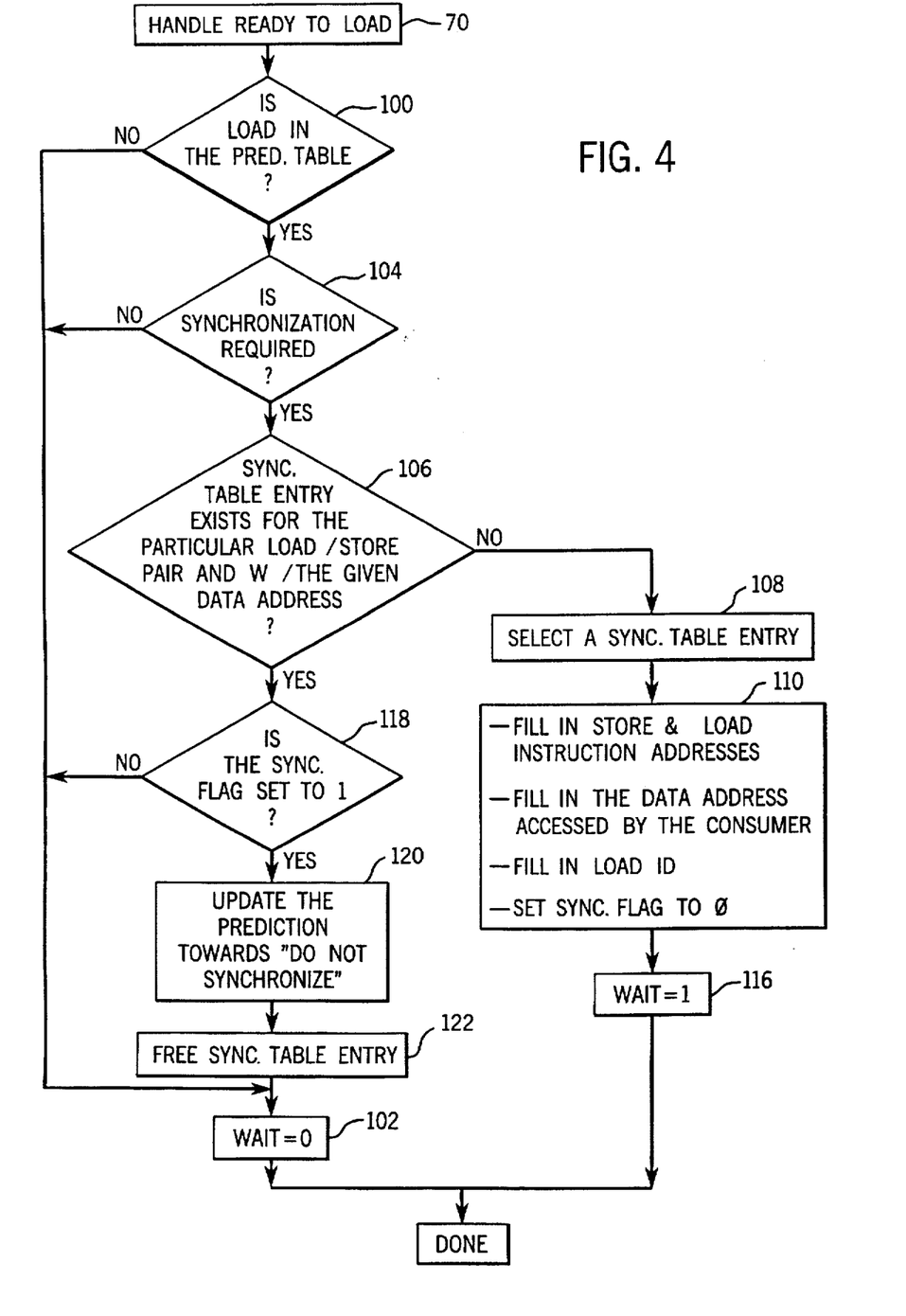
FIG. 4 is a flow chart showing the steps performed by the predictor circuit of FIG. 1 upon receiving a READY TO LOAD message from the data speculation circuit.

As an example, assume that instruction 8.2 in FIG. 2 becomes ready for its operation to be performed. Referring now to FIG. 3, instruction 8.2 is a LOAD instruction and thus will cause a HANDLE READY TO LOAD signal to be passed to the predictor circuit 33. Referring to FIG. 4, at decision block 100, the predictor circuit 33 reviews a prediction table 44 shown generally in FIG. 5 to see if the particular instruction 8.2 identified by its physical address is in the prediction table 44.

Figure 5:
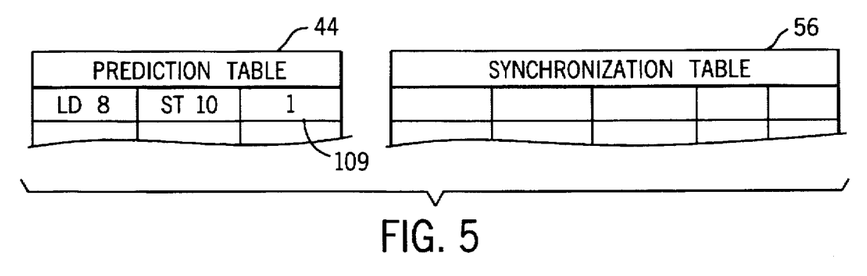
FIG. 5 is fragmentary view of prediction and synchronization tables used by the predictor circuit of FIG. 1.

The prediction table 44 includes three elements for each entry, the elements depicted as columns, the entries as rows. The first column identifies, by physical address, an instruction that is ready for its operation to be performed; the second column identifies the instruction on which the instruction in the first column may be data dependent; and the third column holds a prediction 109 as will be described.

For the purpose of this example, it will be assumed that the prediction table 44 is initially empty. In this case at decision block 100, the operation of the predictor circuit 33 is to set the wait flag equal to zero as indicated by process block 102 and return that flag value to the data speculation circuit 30 as has been described. Generally, the prediction table 44 has an entry if there has been a historical pattern of mis-speculation and thus at least one mis-speculation. Accordingly, if no entry is found in the prediction table 44, the reasonable assumption is that speculation can proceed. How the prediction table 44 is loaded will be described below.

If there is an entry in the prediction table 44 at decision block 104, then the prediction 109 of the prediction table 44 is examined to see if it indicates that it is likely there is data dependence of this instruction. The higher the prediction 109, the more likelihood of mis-speculation if the instruction of the first column is executed before the instruction of the second column. Normally the prediction 109 starts at zero when an entry is first made in the prediction table 44 and is incremented and decremented as will be described below. At decision block 104, if synchronization is not required as indicated by the prediction 109, the program proceeds to process block 102. On the other hand, if the prediction 109 indicates that there is a likelihood of mis-speculation, the program proceeds to process block 106 and a synchronization table 56 is examined.

The synchronization table 56 is generally similar to the prediction table 44 but whereas the prediction table 44 compiles a prediction statistic as to whether data dependence exists between a LOAD/STORE pair, the synchronization table 56 indicates whether there is in fact a pending LOAD instruction awaiting its dependent STORE instruction.

Figure 6:
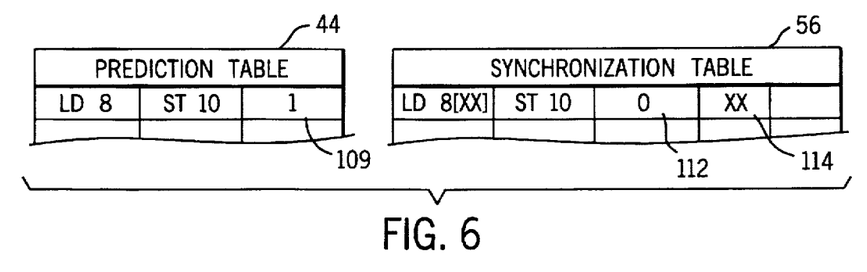
FIG. 6 is a figure similar to that of FIG. 5 showing the prediction and synchronization tables at a later point in the operation of the predictor circuit.

Assuming that there is no entry in the synchronization table 56 as shown in FIG. 5, then an entry must be added to reflect the fact that there is a pending LOAD instruction that must wait for its preceding STORE instruction. At process block 108, a new row of the table is selected and at process block 110 an entry is created. In this creation of an entry, the STORE instruction address is filled in as indicated in FIG. 6. The address of the LOAD instruction is also stored. A synchronization flag 112 is set equal to zero indicating that the STORE instruction with which this LOAD instruction must be synchronized has not occurred and a LOAD identifier 114 is entered providing a unique number for this instance of the LOAD instruction used for tracking the instruction and generated arbitrarily with the only requirement that it be unique to this particular instruction.

At process block 116, the wait flag is set. This is the same wait flag that is used by the data speculation circuit 30 as shown in process block 72 of FIG. 1.

Referring again to decision block 106, if there is an entry in the synchronization table 56 then the program proceeds to decision block 118 where the synchronization table 56 is checked to see if the synchronization flag 112 is equal to 1. If so, the program branches to process block 102 and sets the wait flag equal to zero which causes the data speculation circuit 30 to go ahead and issue a LOAD request. This is a situation where another instance of the LOAD instruction is in fact waiting for the same predicate STORE instruction and the decision is made simply to release the current LOAD instruction.

On the other hand, at decision block 118, if the synchronization flag 112 is set to 1, that indicates that the predicate STORE instruction has already occurred and the LOAD instruction may be released as no longer being data dependent. In this case, the prediction that there was a need to synchronize was wrong and so at process block 120 the prediction 109 is decremented toward the do not synchronize state. Finally, at process block 122 the entry of the synchronization table 56 is erased as no longer needed so as to preserve room in the synchronization table 56.

2. Handle Store

Figure 7:
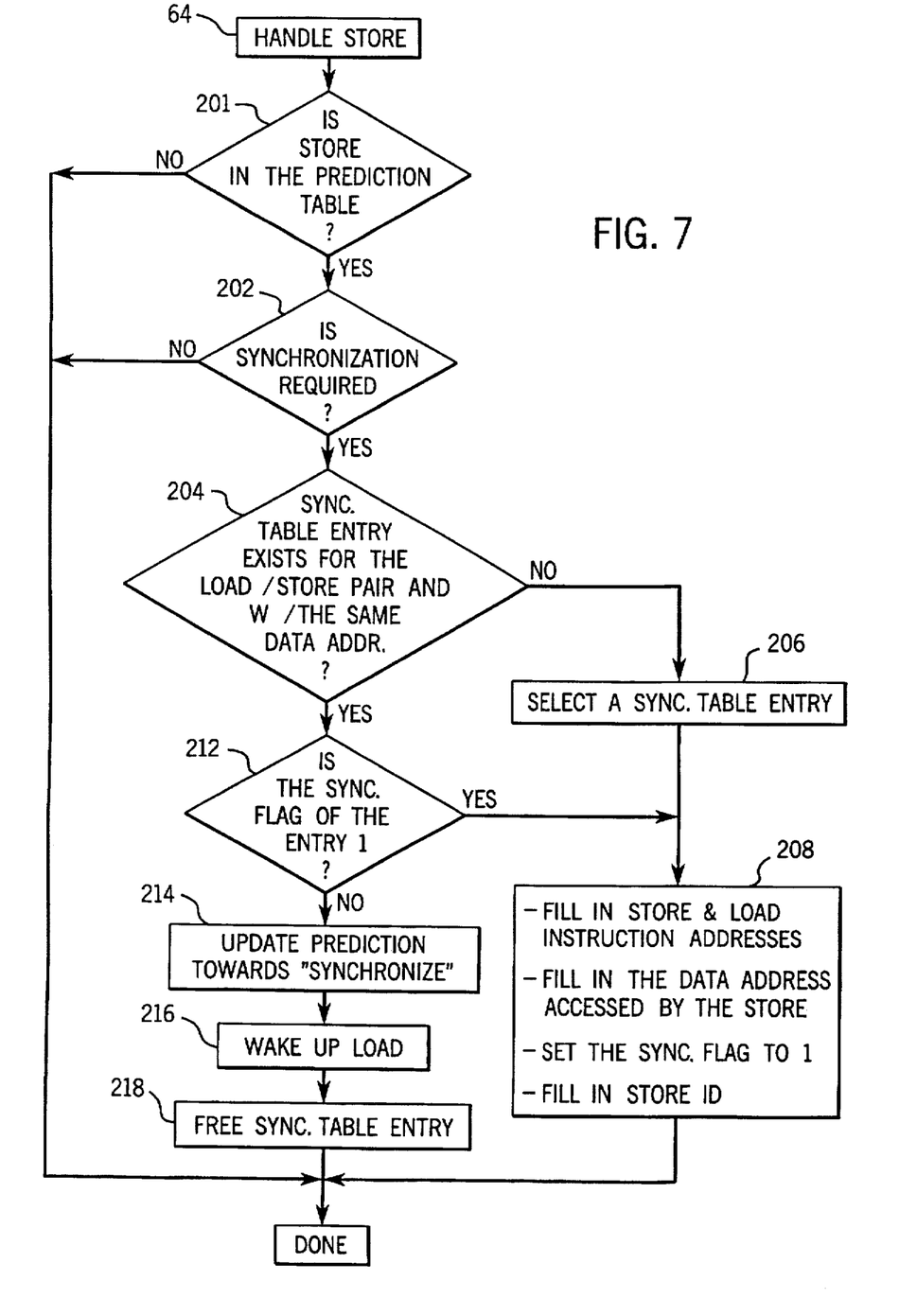
FIG. 7 is a flow chart showing the steps performed by the predictor circuit of FIG. 1 upon receiving a HANDLE STORE message from the data speculation circuit.
Figure 8:
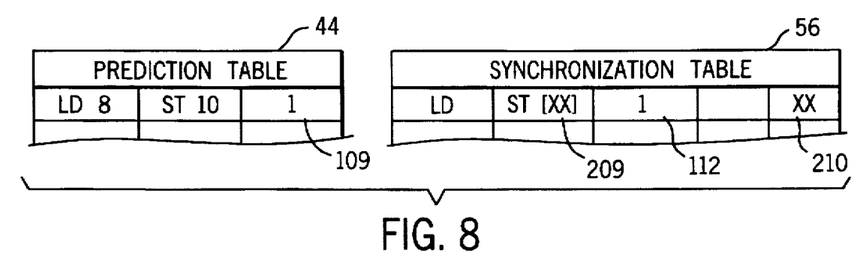
FIG. 8 is a figure similar to that of FIGS. 5 and 6 showing the prediction and synchronization tables at yet a later point.

Referring now to FIG. 7, the initial stages of the HANDLE STORE routine of process block 64 are similar to that of the HANDLE READY TO LOAD. That is at a process block 201, the prediction table 44 is checked to see if the STORE instruction is in the prediction table 44. If not, the program exits, but if so at decision block 202, the prediction 109 is checked to see if synchronization is required between this instruction and another LOAD instruction. If not, again the program exits but if so, at decision block 204 the synchronization table 56 is checked to see if a previous dependent LOAD instruction is awaiting execution. If not, at process block 206, a new entry is added to the synchronization table 56 and at process block 208 that new entry is loaded with the STORE and LOAD instruction addresses, the data address 209 of the STORE instruction (as indicated in FIG. 6), the synchronization flag 112 is set to 1, and a STORE ID 210 identifying uniquely that STORE instruction is added to the table. The program then exits again, the STORE instruction having been executed.

At decision block 204, if a synchronization table entry is present, then at decision block 212 the synchronization flag 112 is checked. If the synchronization flag is 1, indicating that entry exists already indicating that a predicate STORE instruction has been enrolled (but never claimed by a dependent LOAD instruction), the program proceeds to process block 208 and that entry is replaced with the data from the present STORE instruction.

More typically, the synchronization flag 112 will be zero indicating that there is a pending LOAD instruction. In this case, the prediction 109 is updated toward the synchronize condition indicating that the prediction that there was a need to synchronize was correct as there is in fact a LOAD instruction waiting to be synchronized.

The LOAD instruction is released at process block 216 and the entry in the synchronization table 56 is erased at process block 218.

3. Handle Mis-Speculation

Figure 9:
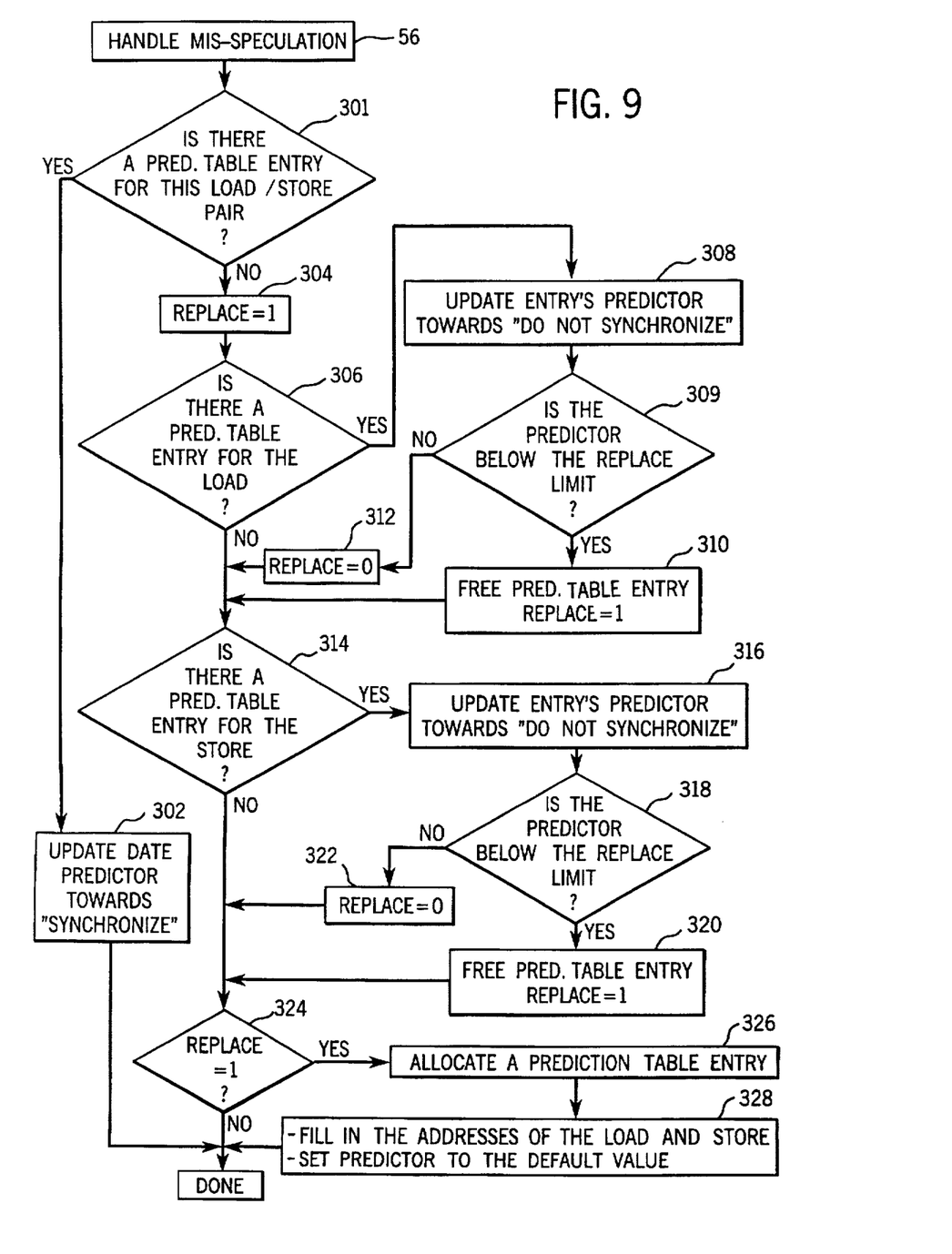
FIG. 9 is a flow chart showing the steps performed by the predictor circuit of FIG. 1 upon receiving a HANDLE MIS-SPECULATION message from the data speculation circuit.

Referring now to FIG. 9, the predictor circuit 33 must also make adjustments in its prediction table 44 if there is a mis-speculation, an occurrence that provides considerable information as to whether synchronization is required. At an initial decision block 301, the prediction table 44 is checked to see whether the LOAD/STORE pair causing the mis-speculation is in the prediction table 44 already. If so then at process block 302, the prediction 109 is updated toward synchronize so that this mis-speculation may be avoided in the future. If not, a 'replace' flag is set equal to 1 at process block 304 and the program proceeds to decision block 306 and the prediction table 44 is again examined but this time for an entry having only the LOAD instruction.

Such an entry indicates a possible lack of temporal locality, that is, indicates that there are different instances of the instructions having different data dependencies that can make the prediction wrong. It is desired in this case to neutralize these table entries, but slowly, as it cannot be determined which particular instance represents the better prediction. Accordingly at process block 308, the prediction 109 is moved toward the do not synchronize direction or decremented and if it is below a limit as determined at process block 309, the table entry is deleted at process block 310 and the value of the flag replace is set equal to 1.

In cases where the prediction 109 is still above the limit, then the program proceeds to process block 312 and the replace flag is set equal to zero. In all cases, the program next proceeds to decision block 306 and a similar inquiry is made for the STORE instruction, that is whether a prediction table entry exists having only the STORE instruction. As with process block 308 to 312, the same steps are taken to eliminate possibly erroneous predictions. That is at process block 316, the prediction 109 is moved toward the do not synchronize value at decision block 318 if the prediction 109 is below a certain limit, the program proceeds to process block 320 and the prediction table entry is erased and the replace flag set equal to 1.

If the prediction 109 is not below the limit, then replace is set equal to zero at process block 322 and the program proceeds to decision block 324, the same destination being arrived at from decision block 314 if there is no entry for either the STORE or LOAD instructions at decision blocks 306 and 314.

At decision block 324, if the replace flag equals 1 indicating that there are absolutely no prediction table entries left that match either one of the instructions involved in this mis-speculation, then at process block 326 a prediction table entry is allocated and at process block 328 the addresses of the LOAD and STORE instructions are inserted in the prediction table 44 and the prediction 109 is set to the default value, typically zero. If the value of the replace flag did not equal the 1 indicating that there was an entry, no further processing is needed.

4. Handle Load

Figure 10:
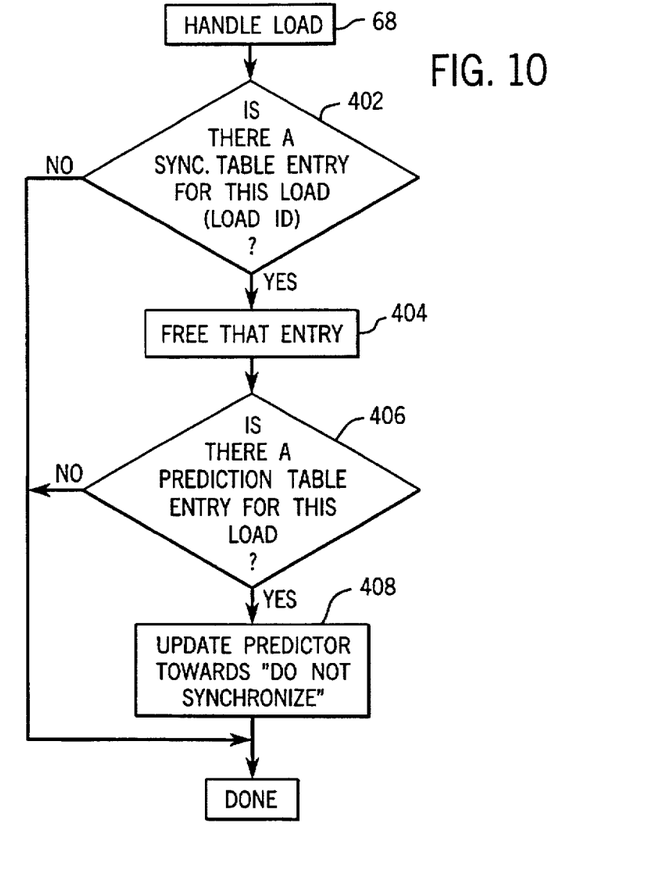
FIG. 10 is a flow chart showing the steps performed by the predictor circuit of FIG. 1 upon receiving a HANDLE LOAD message from the data speculation circuit.

Referring now to FIG. 10, the HANDLE LOAD routine of process block 68 is relatively straightforward and first examines, at decision block 402, whether there is a synchronization table entry for this particular LOAD instruction which has now been released for execution. If so at process block 404 that entry is erased. Next at decision block 406, prediction table 44 is examined for this particular LOAD instruction. If there is an entry in the prediction table 44, then the prediction 109 is decremented toward a do not synchronize condition at process block 408.

5. Handle Squash

Figure 11:
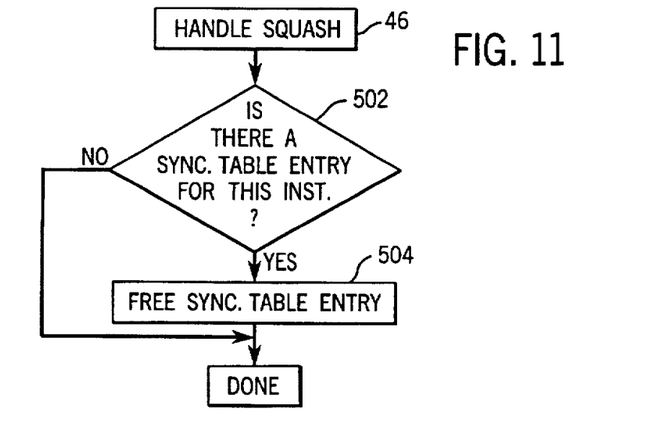
FIG. 11 is a flow chart showing the steps performed by the predictor circuit of FIG. 1 upon receiving a HANDLE SQUASH message from the data speculation circuit.

Referring now to FIG. 11, the predictor circuit 33 must also receive the handle squash message of block 46 with regard to updating the synchronization table 56. Specifically, at a decision block 502, if there is a synchronization entry, that synchronization entry is eliminated at process block 504.

As will be understood from this description, the prediction 109 is used to determine the likelihood of a dependency between two instructions in the future. The higher the prediction 109 the more likelihood of mis-speculation if the instruction in the first column is executed before the instruction in the second column. It will be understood that the prediction 109 may be obtained by methods other than simply incrementing it in value for each speculation as is described herein. For example, various weighting schemes can be provided to cause the predictor circuit 33, for example, to be less sensitive to the earliest mis-speculations. More complex pattern matching techniques may be also used, for example, to catch situations where mis-speculations occur in groups or regular patterns.

The present inventors believe that a relatively limited number of LOAD/STORE pairs will create mis-speculation and so the operation described above prevents the majority of the LOAD/STORE pairs from being slowed in execution. The list of critical LOAD/STORE pairs is prepared dynamically in a synchronization method for those LOAD/STORE pairs is created that can expand or shrink depending on the operation of the program. It should be noted that the present invention may be used in any processor where execution of instructions deviates from the program order, for example, processing units that during execution of time consuming instructions may move to other instructions out of order to begin their execution.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

We claim:

1. In a processor capable of executing program instructions in an execution order differing from their program order, the processor further having a data speculation circuit for detecting data dependence between instructions and detecting a mis-speculation where a data consuming instruction dependent for its data on a data producing instruction of earlier program order, is in fact executed before the data producing instruction, a data speculation decision circuit comprising:

a) a predictor receiving a mis-speculation indication from the data speculation circuit to produce a prediction associated with the particular data consuming instruction and based on the mis-speculation indication; and b) a prediction threshold detector preventing data speculation for instructions having a prediction within a predetermined range.

2. The data speculation decision circuit of claim 1 wherein the prediction threshold detector includes an instruction synchronization circuit instructing the processor to delay a later execution of the particular data consuming instruction until after the particular data producing instruction when the prediction associated with the data consuming instruction is within the predetermined range.

3. The data speculation decision circuit of claim 2 wherein the instruction synchronization circuit includes a prediction table listing certain data consuming instructions and certain data producing instructions each associated with a prediction and wherein the instruction synchronization circuit delays the particular data consuming instruction only:

i) when the prediction associated with the data consuming instruction is within a predetermined range; and ii) when the particular data consuming instruction is in the prediction table.

4. The data speculation decision circuit of claim 3 wherein the certain data consuming and data producing instructions are identified in the prediction table only by the address of the instructions in a program memory.

5. The data speculation decision circuit of claim 2 wherein the instruction synchronization circuit includes a synchronization table associating the certain data consuming instructions and the certain data producing instructions each with a flag value indicating whether the respective certain data producing instruction has been executed and wherein the instruction synchronization circuit delays the particular data consuming instruction only:

i) when the prediction associated with the data consuming instruction is within a predetermined range; and ii) when the particular data consuming instruction is in the prediction table; and iii) when the flag indicates the particular data producing instruction has not been executed.

6. The data speculation decision circuit of claim 2 wherein the instruction synchronization circuit creates an entry in the synchronization table including the particular data consuming instructions and data producing instructions and the flag value only after a mis-speculation indication is received for the particular data consuming instruction and the particular data producing instruction.

7. The data speculation decision circuit of claim 5 wherein when the flag indicates the particular data producing instruction has been executed, the instruction synchronization circuit removes the entry from the synchronization table.

8. The data speculation decision circuit of claim 1 wherein the prediction produces the mis-speculation indication by tallying the mis-speculation indications for a data consuming instruction.

9. In a processor capable of executing program instructions in an execution order differing from the program order of the instructions, the processor further having a data speculation circuit for detecting data dependence between instructions and detecting a mis-speculation where a data consuming instruction dependent for its data on a data producing instruction of earlier program order, is in fact executed before the data producing instruction, a data speculation decision circuit comprising:

a) a prediction table communicating with the data speculation circuit to create an entry listing a particular data consuming instruction and data producing instruction each associated with a prediction when a mis-speculation indication is received; and b) an instruction synchronization circuit only instructing a processor to delay a later execution of the particular data consuming instruction if the prediction table includes an entry.

* * * * *